US008977816B2

(12) United States Patent
Jeong (10) Patent No.: US 8,977,816 B2
(45) Date of Patent: Mar. 10, 2015

(54) CACHE AND DISK MANAGEMENT METHOD, AND A CONTROLLER USING THE METHOD

(75) Inventor: Soo Gil Jeong, Seongnam-si (KR)

(73) Assignee: OCZ Storage Solutions Inc., San Jose, CA (US)

( * ) Notice: Subject to any disclaimer, the term of this patent is extended or adjusted under 35 U.S.C. 154(b) by 626 days.

(21) Appl. No.: 13/264,275

(22) PCT Filed: Dec. 23, 2009

(86) PCT No.: PCT/KR2009/007697
§ 371 (c)(1),
(2), (4) Date: Oct. 13, 2011

(87) PCT Pub. No.: WO2010/120032
PCT Pub. Date: Oct. 21, 2010

(65) Prior Publication Data
US 2012/0036311 A1  Feb. 9, 2012

(30) Foreign Application Priority Data

Apr. 17, 2009  (KR) .................. 10-2009-0033479

(51) Int. Cl.
*G06F 13/00* (2006.01)
*G06F 12/08* (2006.01)

(52) U.S. Cl.
CPC ........ *G06F 12/0868* (2013.01); *G06F 12/0873* (2013.01); *G06F 2212/261* (2013.01); *G06F 2212/281* (2013.01)
USPC ........... 711/123; 711/103; 711/113; 711/156; 710/19; 710/28; 710/60; 710/120; 710/310; 712/25; 712/225; 712/240; 365/189.17; 365/189.2; 360/98.01; 360/135; 360/234

(58) Field of Classification Search
USPC ........ 711/103, 122, 144, 159, 113, 123, 156; 710/19, 28, 60, 120, 310; 712/25, 225, 712/240; 369/13.39; 365/189.17, 189.2; 360/98.01, 135, 234
See application file for complete search history.

(56) References Cited

U.S. PATENT DOCUMENTS

| | | | | |
|---|---|---|---|---|
| 5,142,627 A | * | 8/1992 | Elliot et al. | 710/5 |
| 5,835,955 A | * | 11/1998 | Dornier et al. | 711/162 |
| 6,148,368 A | * | 11/2000 | DeKoning | 711/113 |
| 7,363,418 B1 | * | 4/2008 | Westin et al. | 711/4 |
| 7,979,639 B2 | * | 7/2011 | Koseki | 711/118 |
| 2003/0177305 A1 | | 9/2003 | Hetrick | |
| 2006/0174061 A1 | * | 8/2006 | Shimada | 711/114 |
| 2007/0094445 A1 | * | 4/2007 | Trika et al. | 711/113 |
| 2007/0288699 A1 | * | 12/2007 | Wang et al. | 711/143 |

FOREIGN PATENT DOCUMENTS

JP  2000-181798  6/2000

\* cited by examiner

*Primary Examiner* — Reba I. Elmore
(74) *Attorney, Agent, or Firm* — Hartman Global IP Law; Gary M. Hartman; Domenica N. S. Hartman

(57) ABSTRACT

A cache and disk management method is provided. In the cache and disk management method, a command to delete all valid data stored in a cache, or specific data corresponding to a part of the valid data may be transmitted to a plurality of member disks. That is, all of the valid data or the specific data may exist in the cache only, and may be deleted from the plurality of member disks. Accordingly, the plurality of member disks may secure more space, an internal copy overhead may be reduced, and more particularly, solid state disks may achieve better performance.

21 Claims, 8 Drawing Sheets

- Fully Exclusive Implementation -

- Partially Exclusive Implementation -

CACHE AND DISK MANAGEMENT METHOD, AND A CONTROLLER USING THE METHOD

CROSS-REFERENCE TO RELATED APPLICATIONS

This application is the National Stage of International Application No. PCT/KR2009/007697, filed on Dec. 23, 2009, which claims the priority of Korean Patent Application No. 10-2009-0033479, filed on Apr. 17, 2009. The contents of all applications are hereby incorporated by reference in their entirety.

TECHNICAL FIELD

The present invention relates to a method for managing a cache and a disk, and more particularly, to a technology for processing data commonly stored in a cache and a disk.

BACKGROUND ART

Recently, an interest in a solid state disk has greatly increased. The solid state disk includes a flash memory, a synchronous dynamic random access memory, and the like.

Since the solid state disk does not require a mechanical operation device such as a motor which is used for the hard disk drive, relatively little heat and noise are emitted during the operation. Additionally, the solid state disk is robust against an external shock, and may achieve a higher data transmission rate than a hard disk drive.

Generally, in opposition to a hard disk drive, the solid state disk provides a better performance when an amount of free space increases, and reduces an amount of consumed power. Also, a great deal of data unnecessarily existing in the solid state disks may cause an increase in internal copy overhead, and an increase in an amount of power consumed. Accordingly, there may be a need to properly delete the unnecessary data.

Also, a cache is used to increase a rate of writing data in the solid state disk, and a rate of reading data from the solid state disk. That is, the cache is used to increase an access rate by storing frequently requested data. However, when predetermined data is stored in the cache, there is a problem in that the predetermined data stored in the cache is, in general, redundantly stored in the solid state disk. That is, the predetermined data stored in the solid state disk may be unnecessary.

Accordingly, there is a need for a technology that may delete data unnecessarily stored in a solid state disk, without loss of data, based on a relation between a cache and the solid state disk.

DISCLOSURE OF INVENTION

Technical Goals

An aspect of the present invention provides a cache and disk management method and a controller that may increase performance of member disks and may reduce an amount of consumed power, by transmitting, to the member disks, a command to delete data duplicated in the cache and the member disks.

Another aspect of the present invention provides a cache and disk management method and a controller that may more efficiently manage a cache and disk, by properly setting a state of data stored in the cache.

Still another aspect of the present invention provides a cache and disk management method and a controller that may prevent data loss by properly updating data, writing the data back, and properly setting a state of data stored in the cache.

Yet another aspect of the present invention provides a cache and disk management method and a controller that may reduce a risk due to data loss by employing a write-back cache that a mirroring scheme and the like may be applied to.

Further another aspect of the present invention provides a cache and disk management method and a controller that may provide a solution applicable to an environment requiring a parity.

Technical Solutions

According to an aspect of the present invention, there is provided a method of managing a cache and a disk, the method including searching for target data in a cache in response to a request from a host to read the target data, caching, from a plurality of member disks, the target data in the cache based on a result of the search, and transmitting, to the plurality of member disks, a command to delete the target data in response to the caching of the target data. Here, the plurality of member disks may correspond to a solid state disk, and the cache may correspond to a write-back cache.

The transmitting may include transmitting, to the plurality of member disks, the delete command based on a first delete policy to transmit a command to delete all valid data stored in the cache, or a second delete policy to transmit a command to delete a portion of the valid data.

The cached target data may be used as a new member of a parity group.

The searching may include searching for the target data in the cache, using one of direct mapping, fully associative mapping, and set-associative mapping.

The cache and disk management method may further include setting a state of the cached target data depending on whether the delete command is transmitted. Here, the state of the cached target data may indicate whether the delete command is transmitted, or whether the cached target data is cached from the plurality of member disks.

In this instance, the method may further include transmitting, to the host, found target data when the target data is found in the cache.

According to another aspect of the present invention, there is provided a method of managing a cache and a disk, the method including caching target data in a cache in response to a request from a host to write the target data, and transmitting, to a plurality of member disks, a command to delete the target data in response to the caching of the target data.

The caching may include caching the target data without a replacement taking place in the cache when the target data is not pre-stored in the cache. Alternatively, the caching may include writing back, to the plurality of member disks, victim data according to a replacement before the target data is cached when the target data is not pre-stored in the cache, and the replacement takes place in the cache.

The caching may include updating pre-stored target data when the target data is pre-stored in the cache, and the transmitting may include transmitting the delete command when the target data is stored in the plurality of member disks.

In particular, the caching may include caching a parity to be updated based on the target data, and the transmitting may include transmitting a command to delete the parity to the plurality of member disks.

In this instance, the cache and disk management method may further include setting a state of the cached target data depending on whether the delete command is transmitted, and mirroring the cached target data and the cached parity to the cache.

Effect of Invention

According to embodiments of the present invention, there is provided a cache and disk management method and a controller that may increase performance of member disks and may reduce an amount of consumed power, by transmitting, to the member disks, a command to delete data duplicated in the cache and the member disks.

According to embodiments of the present invention, there is provided a cache and disk management method and a controller that may more efficiently manage a cache and disk, by properly setting a state of data stored in the cache.

According to embodiments of the present invention, there is provided a cache and disk management method and a controller that may prevent data loss by properly updating data, writing the data back, and properly setting a state of data stored in the cache.

According to embodiments of the present invention, there is provided a cache and disk management method and a controller that may reduce a risk due to data loss by employing a write-back cache that a mirroring scheme, and the like may be applied to.

According to embodiments of the present invention, there is provided a cache and disk management method and a controller that may provide a solution applicable to an environment requiring a parity.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
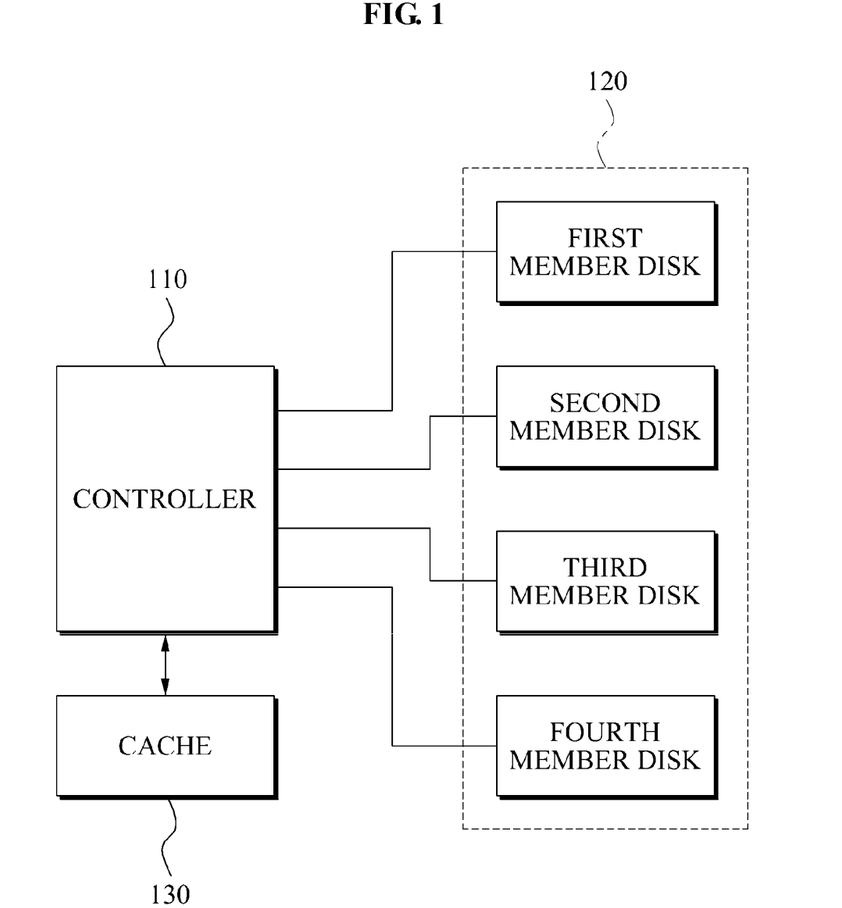
FIG. 1 is a diagram illustrating a controller, a cache, and a plurality of member disks according to a related art.

FIG. 1 is a diagram illustrating a controller, a cache, and a plurality of member disks according to a related art.

Referring to FIG. 1, a storage system may include a controller 110, a plurality of member disks 120, and a cache 130.

Generally, data frequently requested is stored in the cache 130 in order to increase an access rate. For example, data frequently requested to be read is pre-stored in the cache 130. When data currently requested to be read exists in the data pre-stored in the cache, the data currently requested to be read is transmitted from the cache 130 to a host directly, without accessing the plurality of member disks 120.

Here, the data pre-stored in the cache 130 is redundantly stored in the plurality of member disks 120. In this instance, since the data redundantly stored in the plurality of member disks 120 may not be accessed, the data redundantly stored in the plurality of member disks 120 may be unnecessary. In particular, when the plurality of member disks 120 corresponds to a solid state disk, the unnecessary data may increase an internal copy overhead, and an amount of power consumed. Accordingly, the unnecessary data may need to be properly deleted from the plurality of member disks 120.

Figure 2:
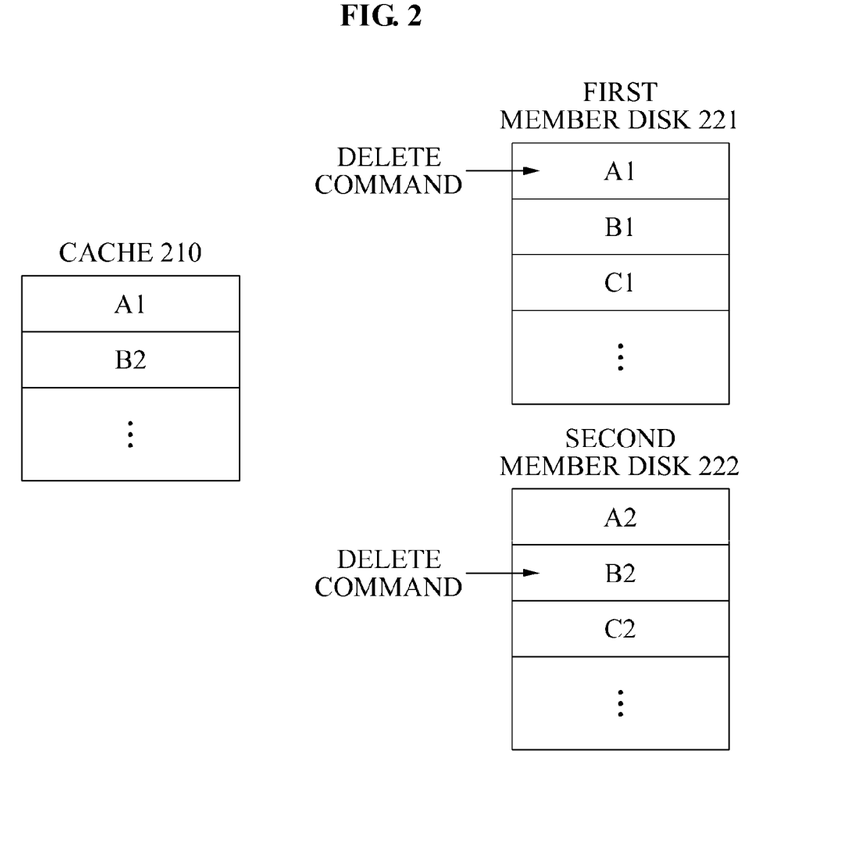
FIG. 2 is a diagram illustrating transmitting a delete command to member disks according to an embodiment of the present invention.

FIG. 2 is a diagram illustrating transmitting a delete command to member disks according to an embodiment of the present invention.

Referring to FIG. 2, data A1, data B1, and data C1 may be stored in a first member disk 221, and data A2, data B2, and data C2 may be stored in a second member disk 222. Also, the data A1 of the first member disk 221, and the data B2 of the second member disk 222 may be stored in a cache 210.

When a request, from a host, to read the data A1 is received, a controller may read the data A1 pre-stored in the cache 210 without accessing the first member disk 221, and may return the data A1 to the host. Similarly, when a request from the host to read the data B2 is received, the controller may read the data B2 pre-stored in the cache 210 without accessing the second member disk 222, and may return the data B2 to the host. Accordingly, the data A1 stored in the first member disk 221, and the data B2 stored in the second member disk 222 may be unnecessary.

In this instance, according to an embodiment of the present invention, when the data A1 and the data B2 are cached in the cache 210, a delete command may be transmitted to the first member disk 221 and the second member disk 222. That is, when the data A1 and the data B2 are cached in the cache 210, the data A1 stored in the first member disk 221, and the data B2 stored in the second member disk 222 may be deleted, and accordingly a free space of the first member disk 221 and a free space of the second member disk 222 may increase. Here, the delete command may correspond to a 'TRIM' command that is commonly used in the art to which the present invention pertains. For ease of reference, the cache according to the present invention may correspond to a write-back cache, including a battery backup dynamic random access memory (DRAM) or a non-volatile memory.

Various embodiments of the present invention will be described hereinafter in detail.

Figure 3:
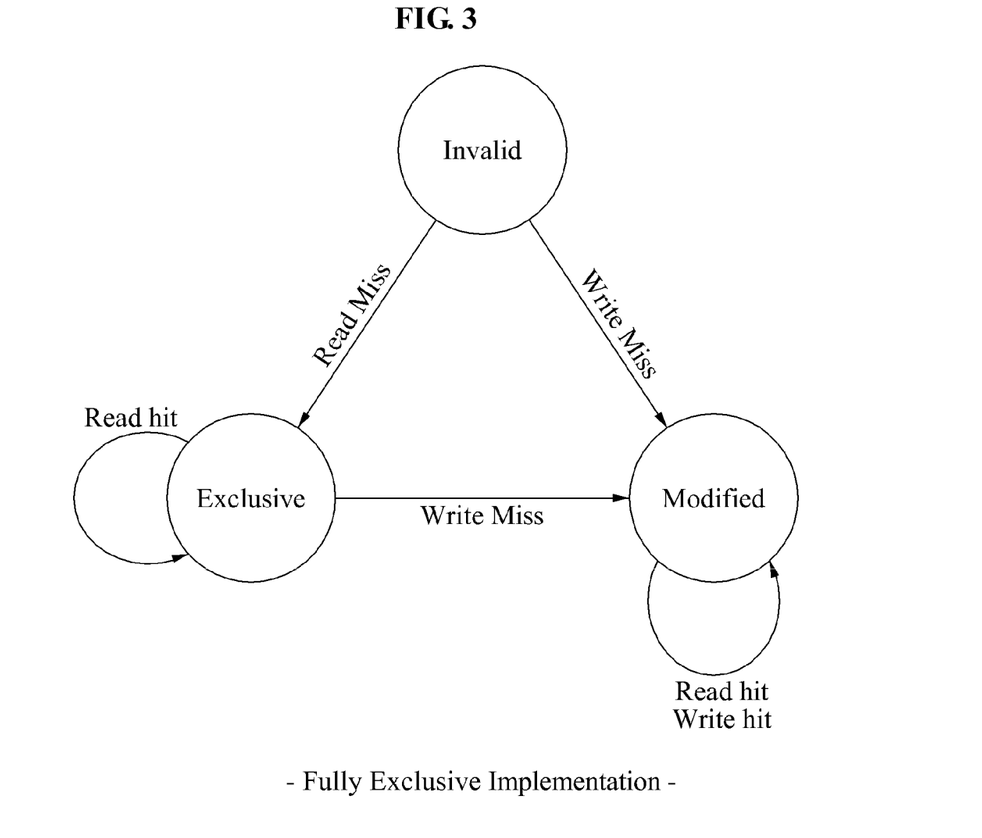
FIG. 3 is a state diagram illustrating a relation between states of data in a case where a first delete policy is applied according to an embodiment of the present invention.

FIG. 3 is a state diagram illustrating a relation between states of data in a case where a first delete policy is applied according to an embodiment of the present invention.

Referring to FIG. 3, when the first delete policy is applied, state of data may be determined to be one of three types, that is, 'invalid,' 'exclusive,' and 'modified.' Here, the three types of the state may be classified based on whether a delete command is transmitted, whether data is updated in accordance with a write request from a host, or the like.

The first delete policy may differ from a second delete policy. According to the first delete policy, all valid data stored in a cache may be deleted from member disks. Contrarily, according to the second delete policy, only data in a predetermined type of state may be deleted among the valid data stored in the cache. An operation performed according to the first delete policy will be referred to as a 'fully exclusive implementation,' and an operation performed according to the second delete policy will be referred to as a 'partially exclusive implementation.'

According to the first delete policy, advantageous points may be greatly increased by deleting duplicated data. However, there is a problem in that a traffic caused by a delete command may increase. On the contrary, according to the second delete policy, a free space to be secured may be less a free space secured according to the first delete policy. However, the traffic caused by the delete command may be reduced.

1) In a case where a 'read miss' occurs during a fully exclusive implementation

When a request from a host to read target data occurs, a controller may search for the target data in a cache. In this instance, the controller may search for the target data in the cache, using one of direct mapping, fully associative mapping, and set-associative mapping.

When the target data is not pre-stored in the cache, a 'read miss' may occur. The occurrence of the 'read miss' may refer to valid data that is not stored in the cache, and a state of the target data at this point may be indicated to be 'invalid.'

When the 'read miss' occurs, the controller may transfer a read request to proper member disks, and the member disks may return target data in response to the read request. In this instance, the controller may store the target data returned from the member disks in a cache. Since all valid data stored in the cache may be deleted from the member disks according to a first delete policy, the controller may transmit, to the member disks, a command to delete the target data. Also, a state of the target data stored in the cache may be set to be 'exclusive', which may indicate the target data is deleted from the member disks according to the first delete policy when a 'read miss' occurs.

2) In a case where a 'read hit' occurs during a fully exclusive implementation

When target data, requested by a host, to be read is pre-stored in a cache, a 'read hit' may occur. In this instance, a controller may extract the target data from the cache, and may provide the extracted target data to the host. A state of the data stored in the cache may be unchanged. A 'modified' state illustrated in FIG. 3 will be described hereinafter.

3) In a case where a 'write miss' occurs during a fully exclusive implementation 3-1) In a case where a replacement is not required When target data requested by a host to be written is not pre-stored in a cache, a 'write miss' may occur. Since valid target data is not stored in the cache, a current state of the target data may be predicted to be 'invalid.'

When the 'write miss' occurs, the target data may be written in the cache. A controller may transmit a command to delete the target data to member disks, in response to the caching of the target data. In this instance, a state of the cached target data may be changed from 'invalid' to 'modified.' The 'modified' state may indicate a state of valid data, and may refer to a state of data updated in the cache in accordance with the write request from the host. Of course, as aforementioned, when a 'read hit' occurs, the state of the data stored in the cache may remain 'modified.'

3-2) In a case where a replacement is required

When a 'write miss' occurs, a replacement may take place in a cache so that target data may be written in the cache. For example, when the cache is full, a victim line including victim data may be selected in order to write the target data in the cache.

When a state of the victim line corresponds to 'invalid,' operations identical to the operations performed in the case where the replacement is not required as described in 3-1) may be performed.

However, when the state of the victim line corresponds to 'exclusive,' the victim data may be stored in the cache only, and may not be stored in member disks. Accordingly, in this instance, a controller may write back the victim data to the member disks in order to prevent data loss. The controller may write the target data on the victim line of the cache, and may transmit a delete command to the member disks.

Similarly, when the state of the victim line corresponds to 'modified,' the victim data may be stored in the cache only, and may not be stored in member disks. Accordingly, the controller may write back the victim data to the member disks. Similar to the case where the state of the victim line corresponds to 'exclusive,' the controller may write the target data on the victim line of the cache, and may transmit a delete command to the member disks.

A state of the target data newly written may be set to be 'modified.'

4) In a case where a 'write hit' occurs during a fully exclusive implementation

When target data is pre-stored in a cache and a 'write hit' occurs, a state of the target data pre-stored in the cache may correspond to 'exclusive' or 'modified.' In this instance, a controller may update the target data pre-stored in the cache, and may set a state of the updated target data to be 'modified.' Since the state of the target data may correspond to 'exclusive' or 'modified,' a transmission of a delete command may not be required.

Figure 4:
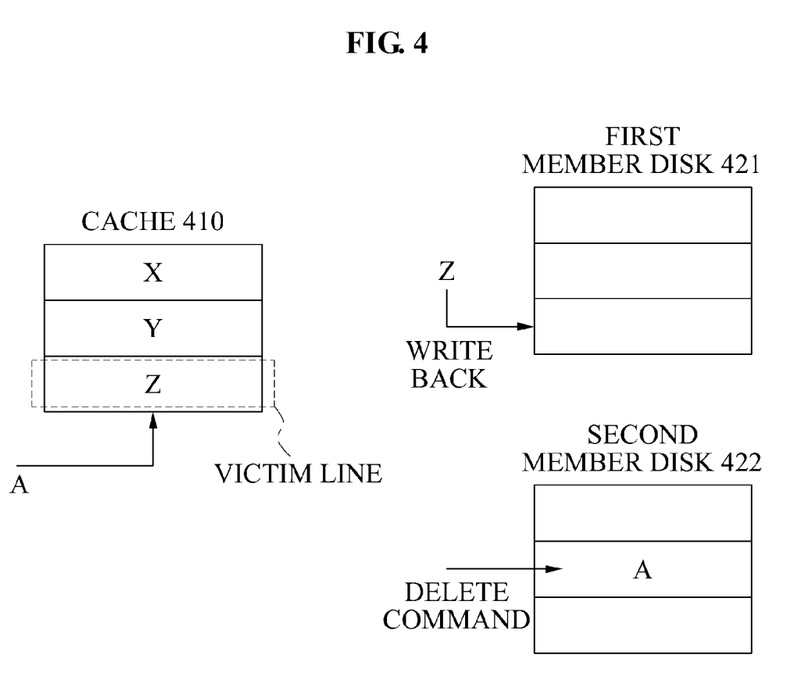
FIG. 4 is a diagram illustrating an operation in a case where a replacement takes place in a cache according to another embodiment of the present invention.

FIG. 4 is a diagram illustrating an example of an operation in a case where a replacement takes place in a cache 410 according to another embodiment of the present invention.

Referring to FIG. 4, all lines of the cache 410 may be occupied with data X, data Y, and data Z, respectively. When a host transmits a request to write data A, a 'write miss' may occur.

In this instance, the data A may be written in the cache 410. However, since the cache 410 is full, one of the lines of the cache 410 may be selected as a victim line. Here, it may be assumed that the line storing the data Z may be selected as the victim line.

A controller may write back victim data Z to a first member disk 421. The data A may be written in the cache 410, and a command to delete the data A stored in a second member disk 422 may be transmitted to the second member disk 422.

Figure 5:
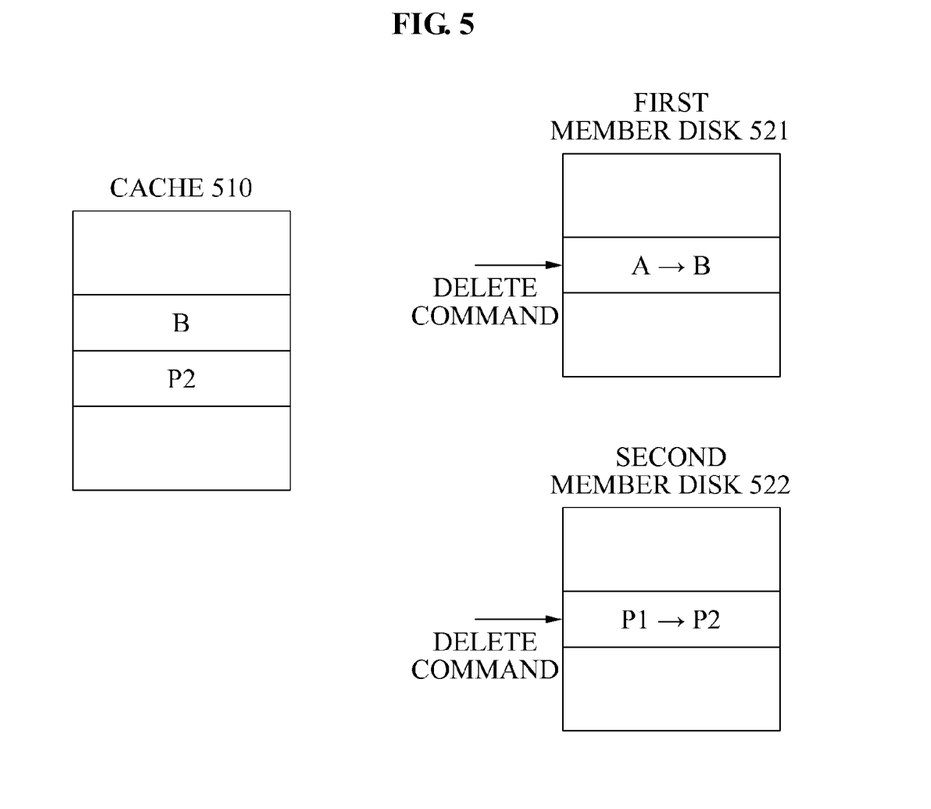
FIG. 5 is a diagram illustrating an operation in a case where a member disk to store a parity is provided according to another embodiment of the present invention.

FIG. 5 is a diagram illustrating an operation in a case where a member disk to store a parity is provided according to another embodiment of the present invention.

Before a description regarding the example of FIG. 5 is provided, embodiments of the present invention may also be applied to a storage system having a parity.

When a 'read miss' occurs, target data may be stored in a cache as aforementioned. In this instance, when a storage system has a parity, the cached target data may be used as a part of a parity group. That is, the cached target data may be used to compensate for failed disks instead of a parity of a parity disk.

When a 'write miss' occurs without a replacement, target data may be newly written in a member disk. Since the target data is newly written in the member disk, a previous parity may also be updated. In this instance, a controller may read the target data from member disks and the previous parity from the parity disk, and may calculate a new parity corresponding to the target data. The controller may write the new parity and the target data in a cache, and may transmit a delete command to the parity disk and the member disks. States of the target data and the parity newly written in the cache may be changed into 'modified.'

In the storage system having the parity, in a case where a 'write miss' occurs with a replacement, processes identical to the aforementioned processes may be performed. However, a process of writing back victim data or a victim parity may be additionally performed.

In the storage system having the parity, in a case where a 'write hit' occurs with a replacement, processes identical to the processes in the case where the 'read miss' occurs may be performed when a current state of the target data corresponds to 'invalid.' However, when the current state of the target data corresponds to 'exclusive' or 'modified,' operations difference to some extent may be performed. More particularly, when a parity exists in a cache, a new parity may be calculated without the need to newly read the parity from the parity disk. The target data and the new parity may be updated in the cache. However, when the parity may need to be read from the member disks, the controller may read the parity, and transmit a delete command.

Referring to FIG. 5, original data A may be stored in a first member disk 521, and an original parity P1 may be stored in a second member disk 522. In this instance, when a 'write miss' occurs in response to a request from a host to write data B, the original data A may be changed to the data B, and accordingly the original parity P1 may need to be changed to a new parity P2.

A controller may store, in a cache, the updated data B and new parity P2, and may transmit a delete command to the first member disk 521 and the second member disk 522.

Figure 6:
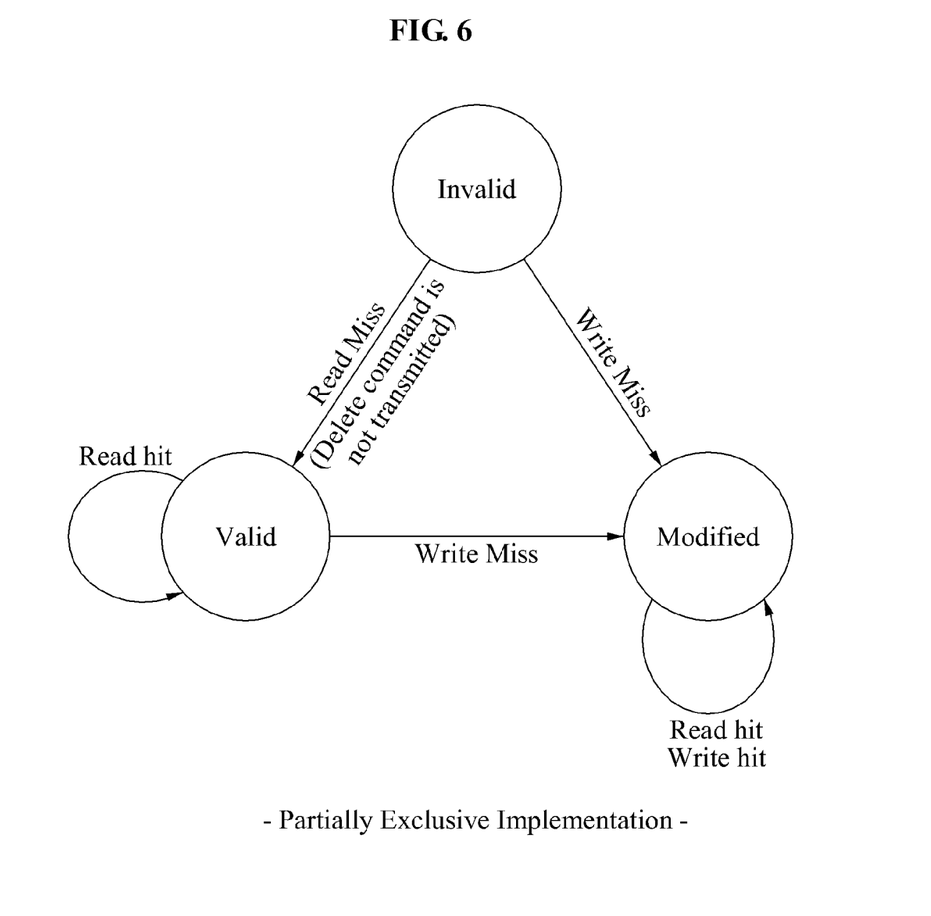
FIG. 6 is a state diagram illustrating a relation between states of data in a case where a second delete policy is applied according to an embodiment of the present invention.

FIG. 6 is a state diagram illustrating a relation between states of data in a case where a second delete policy is applied according to an embodiment of the present invention.

Referring to FIG. 6, when the second delete policy is applied, state of data may be determined to be one of three types, that is, 'invalid,' 'exclusive,' and 'modified.' Here, the three types of the states may be classified based on whether a delete command is transmitted, whether data is updated in accordance with a write request from a host, or the like. As aforementioned, according to the second delete policy, only data in a predetermined type of state may be deleted among valid data stored in a cache.

5) In a case where a 'read miss' occurs during a partially exclusive implementation When a 'read miss' occurs, a controller may transfer a read request to proper member disks, and the member disks may return target data in response to the read request. The target data may be transferred to a host. In this instance, the controller may store the target data returned from the member disks in a cache, and may set a state of the cached target data to be 'valid.' According to the second delete policy, all valid data stored in the cache may not be deleted, and only data in an 'exclusive' state of a predetermined type may be deleted from the member disks. Accordingly, a command to delete the cached target data may not be transmitted to the member disks.

6) In a case where a 'read hit' occurs during a partially exclusive implementation A controller may extract target data from a cache, and may provide the extracted target data to a host. A state of the data stored in the cache may be unchanged.

7) In a case where a 'write miss' occurs during a partially exclusive implementation 7-1) In a case where a replacement is not required When a 'write miss' occurs, target data may be written in a cache. A controller may transmit a command, to member disks, to delete the target data in response to the caching of the target data. A state of the cached target data may be set to be 'modified.'

7-2) In a case where a replacement is required

A victim line including victim data may be selected. When a state of the victim line corresponds to 'valid,' a controller may overwrite the victim data with new data. Also, the controller may transmit a delete command to member disks. The controller may write target data on the victim line of the cache, and may transmit the delete command to the member disks. Also, a state of the target data newly written may be set to be 'modified.'

When the state of the victim line corresponds to 'modified,' the controller may write back the victim data to the member disks, and may overwrite the victim data with new data.

8) In a case where a 'write hit' occurs during a partially exclusive implementation When a state of cached target data corresponds to 'valid,' a controller may update the cached target data, and may transmit a delete command to member disks. However, when the state of the cached target data corresponds to 'modified,' since the target data is absent from the member disks, the cached target data may be updated, whereas the delete command may not be transmitted. A state of the updated target data may be set to be 'modified.'

An operation principle of the present invention that is applied to the partially exclusive implementation may be equally applied to a storage system having a parity. That is, the aforementioned operations may be performed when a 'read miss' and a 'read hit' occurs.

However, when a 'write miss' occurs with a replacement, a previous parity may also need to be updated, and accordingly the controller may calculate a new parity corresponding to the target data. The controller may write the new parity and the target data in the cache, and may transmit a delete command to a parity disk and member disks. States of the target data and new parity written in the cache may be changed to 'modified.'

In the storage system having the parity, in a case where a 'write miss' occurs with a replacement, processes identical to the processes performed in the case where the 'write miss' occurs without a replacement may be performed. However, the following processes may be additionally performed. That is, as necessary, victim lines for the target data and the new parity may be selected. Also, when a state of victim data or a state of a victim parity corresponds to 'valid,' the controller may overwrite the target data or the new parity on the victim lines, and may change the state of the target data or the state of the new parity to be 'modified.' When the state of the victim data or the state of the victim parity corresponds to 'modified,' the controller may write back the victim data or the victim parity, and may write the target data or the new parity in the cache.

Figure 7:
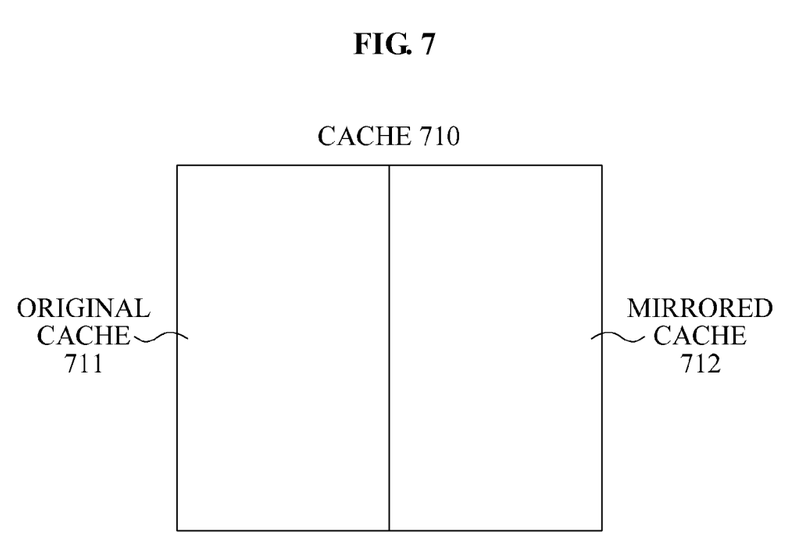
FIG. 7 is a diagram illustrating a cache using a mirroring scheme according to an embodiment of the present invention.

FIG. 7 is a diagram illustrating a cache using a mirroring scheme according to an embodiment of the present invention.

Before a description regarding an example illustrated in FIG. 7, in a fully exclusive implementation, it may be effective to have a redundancy of cache contents in order to reduce a risk according to cache damage. In particular, the cache may include data and a parity, it may be an importance issue to reduce the risk according to the cache damage.

A scheme of mirroring the cache may be a good idea to reduce the risk according to the cache damage. That is, mirroring of the cache to another cache or a predetermined member disk may be considered.

Referring to FIG. 7, an entire cache 710 may be classified into an original cache 711 and a mirrored cache 712. In this instance, the original cache 711 and the mirrored cache 712 may be installed away from each other to be separate units. When the mirrored cache 712 exists although the original cache 711 is damaged, data loss may be prevented.

Different from the illustrated in FIG. 7, a cache may also be mirrored to member disks.

Figure 8:
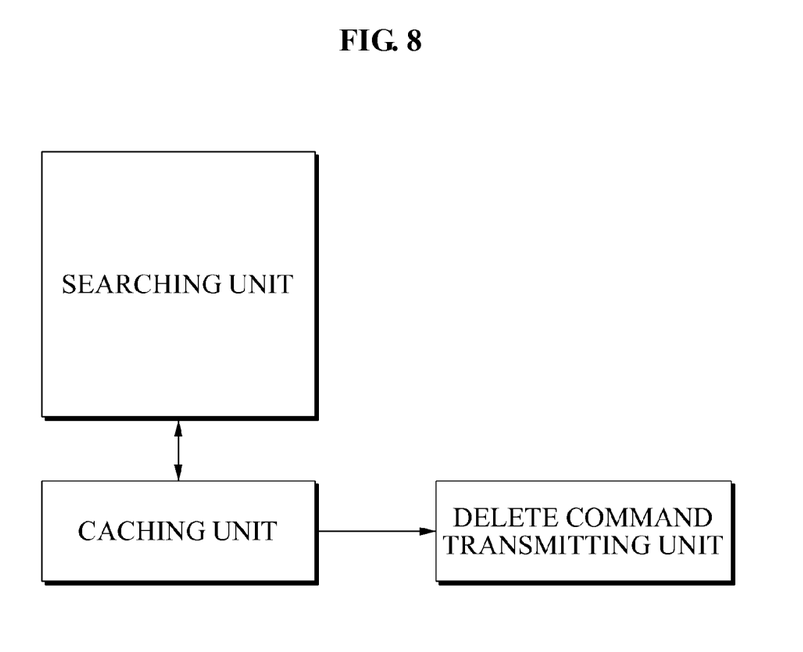
FIG. 8 is a block diagram illustrating a controller according to an embodiment of the present invention.

FIG. 8 is a block diagram illustrating a controller according to an embodiment of the present invention.

Referring to FIG. 8, the controller may include a searching unit, a caching unit, and a delete command transmitting unit.

The searching unit may search for target data in a cache in response to a request from a host to read or write the target data.

The caching unit may cache, from a plurality of member disks, the target data in the cache based on a result of the search.

The delete command transmitting unit may transmit, to the plurality of member disks, a command to delete the target data in response to the caching of the target data. In this instance, the delete command transmitting unit may transmit the delete command to the plurality of member disks, in accordance with a first delete policy to transmit a command to delete all valid data stored in the cache, or a second delete policy to transmit a command to delete a part of the valid data.

Although not shown in FIG. 8, the controller may further include a state setting unit to set a state of the cached target data depending on whether the delete command is transmitted.

The descriptions described with reference to FIGS. 1 through 7 may be applied to the controller illustrated in FIG. 8 and thus, a detailed description will be omitted for conciseness.

The methods of operating the controller according to the above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of managing a cache and a plurality of member disks, the method comprising:
   searching for target data in the cache in response to a request from a host to read the target data;
   caching, from the plurality of member disks, the target data in the cache based on a result of the search; and
   transmitting, to the plurality of member disks, a command to delete the target data from the plurality of member disks in response to the caching of the target data.

2. The method of claim 1, wherein the transmitting comprises transmitting, to the plurality of member disks, the delete command based on a first delete policy to transmit a command to delete from the plurality of member disks all valid data stored in the cache, or a second delete policy to transmit a command to delete from the plurality of member disks a part of the valid data stored in the cache.

3. The method of claim 1, further comprising:
   setting a state of the cached target data depending on whether the delete command is transmitted.

4. The method of claim 1, wherein the cached target data is used as a new member of a parity group.

5. The method of claim 1, further comprising:
   transmitting, to the host, found target data when the target data is found in the cache.

6. The method of claim 1, wherein the plurality of member disks corresponds to a solid state disk, and the cache corresponds to a write-back cache.

7. The method of claim 1, wherein the searching comprises searching for the target data in the cache, using one of the group consisting of direct mapping, fully associative mapping, and set-associative mapping.

8. The method of claim 3, wherein the state of the cached target data indicates whether the delete command is transmitted, or whether the cached target data is cached from the plurality of member disks.

9. A method of managing a cache and a plurality of member disks, the method comprising:
   caching target data in the cache in response to a request from a host to write the target data; and
   transmitting, to the plurality of member disks, a command to delete the target data from the plurality of member disks in response to the caching of the target data.

10. The method of claim 9, wherein the caching comprises caching the target data without a replacement taking place in the cache when the target data is not pre-stored in the cache, and the transmitting comprises transmitting the delete command after the target data is cached.

11. The method of claim 9, further comprising:
    setting a state of the cached target data depending on whether the delete command is transmitted.

12. The method of claim 9, wherein the caching comprises updating pre-stored target data when the target data is pre-stored in the cache, and the transmitting comprises transmitting the delete command when the target data is stored in the plurality of member disks.

13. The method of claim 9, wherein the caching comprises writing back, to the plurality of member disks, victim data according to a replacement before the target data is cached when the target data is not pre-stored in the cache, and the replacement takes place in the cache.

14. The method of claim 9, wherein the caching comprises writing back, to the plurality of member disks, victim data according to a replacement before the target data is cached depending on whether the victim data is stored in the plurality of member disks when the target data is not pre-stored in the cache, and the replacement takes place in the cache.

15. The method of claim 9, wherein the caching comprises caching a parity to be updated based on the target data.

16. The method of claim 15, wherein the transmitting comprises transmitting a command to delete the parity to the plurality of member disks.

17. The method of claim 13, wherein the caching comprises:
  caching a parity to be updated based on the target data; and
  writing back, to the plurality of member disks, the victim data according to the replacement, and a victim parity corresponding to the victim data before the target data and the parity are cached.

18. The method of claim 15, further comprising:
  mirroring the cached target data and the cached parity to the cache.

19. A non-transitory computer-readable medium comprising a program for instructing a computer to perform the method of claim 1.

20. A controller, comprising:
  a searching unit to search for target data in a cache in response to a request from a host to read the target data;
  a caching unit to cache, from a plurality of member disks, the target data in the cache based on a result of the search; and
  a delete command transmitting unit to transmit, to the plurality of member disks, a command to delete the target data from the plurality of member disks in response to the caching of the target data.

21. The controller of claim 20, wherein the caching unit caches the target data in the cache in response to a request to write the target data.

* * * * *